United States Patent
Izumi et al.

(10) Patent No.: US 7,354,377 B2
(45) Date of Patent: Apr. 8, 2008

(54) CONTINUOUSLY VARIABLE TRANSMISSION

(75) Inventors: Tetsuya Izumi, Yokohama (JP); Hironori Nihei, Zama (JP)

(73) Assignee: Jatco Ltd, Shizuoka (JP)

(*) Notice: Subject to any disclaimer, the term of this patent is extended or adjusted under 35 U.S.C. 154(b) by 533 days.

(21) Appl. No.: 11/085,001

(22) Filed: Mar. 21, 2005

(65) Prior Publication Data
US 2005/0221931 A1 Oct. 6, 2005

(30) Foreign Application Priority Data
Mar. 30, 2004 (JP) .............................. 2004-101086

(51) Int. Cl.
*F16H 61/00* (2006.01)
*F16H 61/662* (2006.01)
(52) U.S. Cl. .............................. 477/45; 477/38; 477/50
(58) Field of Classification Search .................. 477/38, 477/45, 50
See application file for complete search history.

(56) References Cited

U.S. PATENT DOCUMENTS
7,025,706 B2 * 4/2006 Katou ........................ 477/45

FOREIGN PATENT DOCUMENTS
JP 59099165 A * 6/1984
JP 2001-263475 A 9/2001

* cited by examiner

*Primary Examiner*—Tisha Lewis
(74) *Attorney, Agent, or Firm*—Foley & Lardner LLP

(57) ABSTRACT

A belt continuously variable transmission includes a primary pulley (1), a secondary pulley (2), a belt (3), a hydraulic pump (21), a speed ratio control valve (13) that regulates hydraulic pressure from the hydraulic pump (21) and supplies the hydraulic pressure to the primary pulley (1) and the secondary pulley (2), a motor (14) that drives the speed ratio control valve (13), a controller (11) that controls the motor (14), and an oil temperature sensor (26) that detects the temperature of a working fluid. The controller (11) stops energization to the motor (14) when the temperature of the working fluid becomes greater than a first predetermined temperature while the vehicle is at rest in an idling state.

8 Claims, 5 Drawing Sheets

CONTINUOUSLY VARIABLE TRANSMISSION

FIELD OF THE INVENTION

This invention relates to a continuously variable transmission.

BACKGROUND OF THE INVENTION

JP2001-263475A, published by the Japan Patent Office in 2001, discloses a belt continuously variable transmission ("CVT"). The belt CVT can change its speed ratio by changing the groove width of pulley around which a belt is wrapped. Changing the groove width is performed by adjusting hydraulic pressure supplied to a hydraulic cylinder provided in a rear surface of the pulley by using a speed ratio control valve. A stepping motor drives the speed ratio control valve.

SUMMARY OF THE INVENTION

The stepping motor used to drive the speed ratio control valve is installed within an oil pan that collects a working fluid from the CVT, which cools the stepping motor. The working fluid absorbs heat generated by the stepping motor, and the stepping motor maintains a temperature within a fixed temperature range.

However, even though the working fluid absorbs the heat generated by the stepping motor, it is advantageous to reduce the amount of heat generated as much as possible. Decreases in the durability of the stepping motor can thus be suppressed, and degradation of the working fluid can thus be reduced.

It is therefore an object of this invention to decrease the amount of heat radiated from a stepping motor used in driving a speed ratio control valve in a belt CVT.

In order to achieve above object, this invention provides a belt continuously variable transmission comprising: a primary pulley and a secondary pulley each having a groove whose width changes in accordance with a pressure of a working fluid supplied; a belt that is hung between the primary pulley and the secondary pulley; a hydraulic pump that discharges the working fluid; a speed ratio control valve that regulates the pressure of the working fluid from the hydraulic pump and supplies the pressure to the primary pulley and the secondary pulley; an actuator that drives the speed ratio control valve; a temperature sensor that detects a temperature of the working fluid; and a controller connected to the actuator and the hydraulic pump and input with a detection signal from the temperature sensor.

The controller determines that deenergization conditions are met when the temperature of the working fluid becomes greater than a first predetermined temperature while a vehicle is at rest in an idling state, and stops energization to the actuator after the deenergization conditions have been met.

The details as well as other features and advantages of this invention are set forth in the remainder of the specification and are shown in the accompanying drawings.

DETAILED DESCRIPTION OF THE PREFERRED EMBODIMENTS

Figure 1:
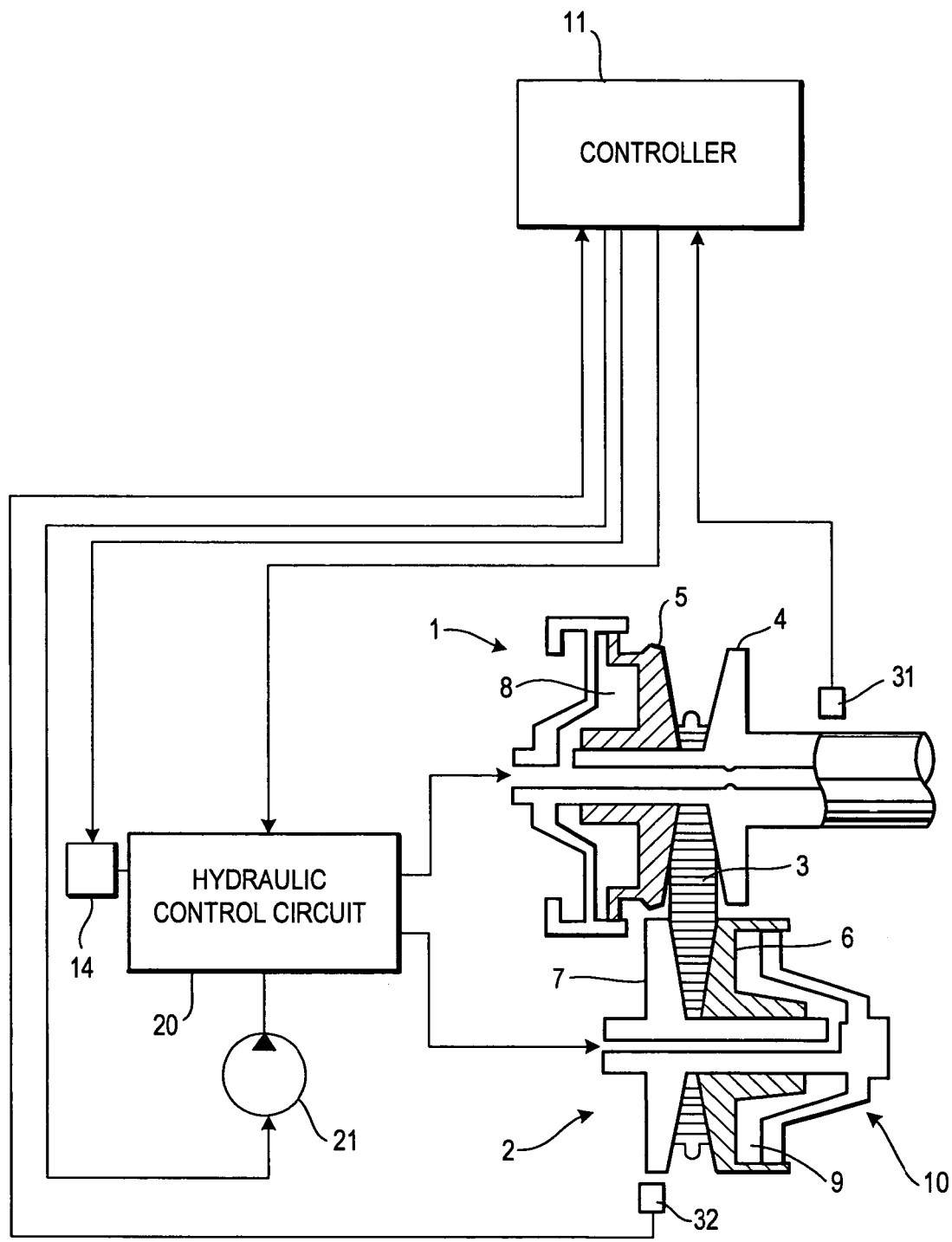
FIG. 1 is a schematic diagram of a continuously variable transmission according to this invention.
Figure 2:
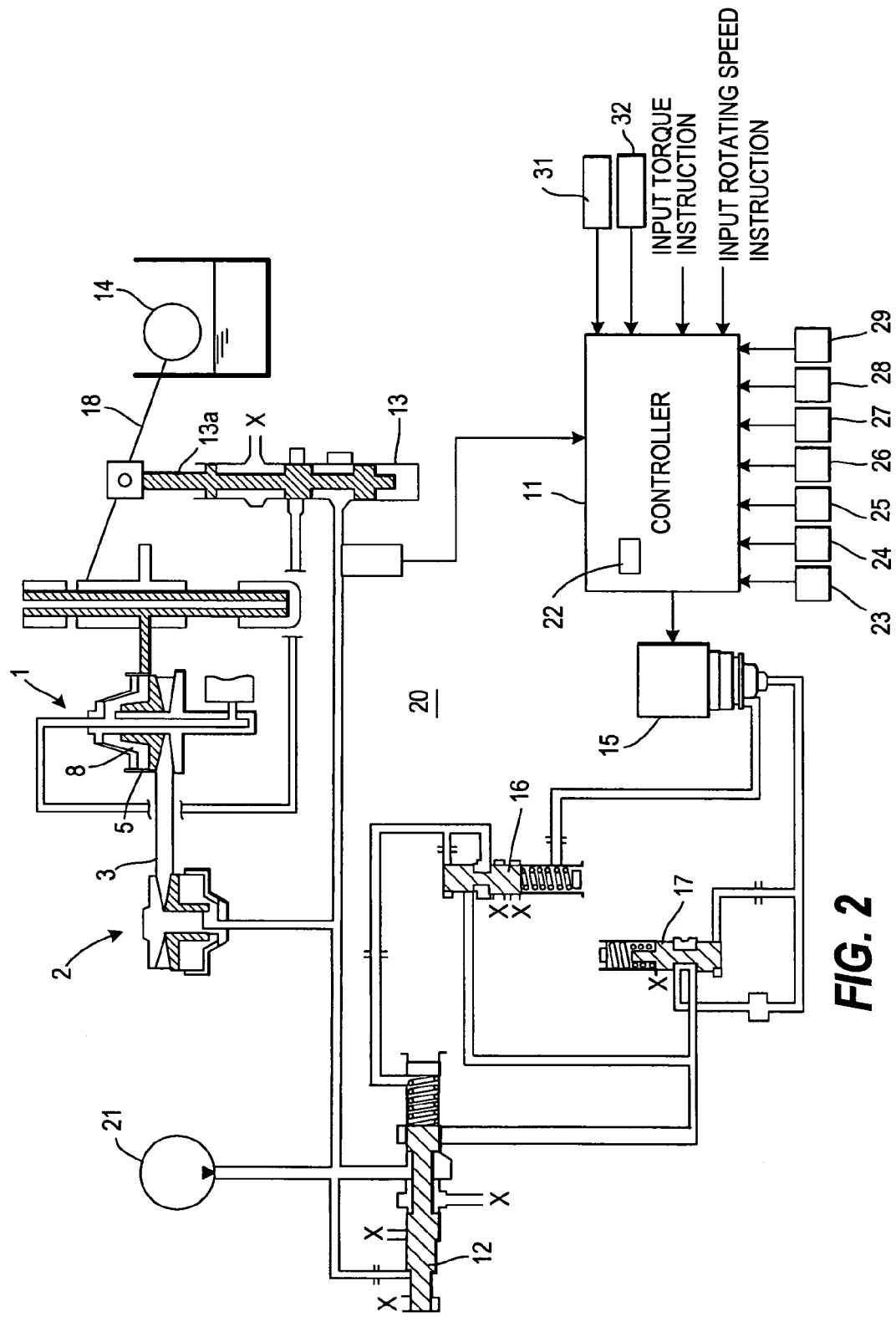
FIG. 2 is a hydraulic control circuit diagram for the transmission.

FIG. 1 shows a schematic configuration of a continuously variable transmission, and FIG. 2 shows a hydraulic control circuit for the continuously variable transmission. A transmission mechanism 10 includes a V-belt 3 hung between a primary pulley 1 and a secondary pulley 2. A V-shape pulley groove is formed in the primary pulley 1 by a fixed pulley 4 that rotates together with an engine output shaft (not shown), and a movable pulley 5 opposite the fixed pulley 4. The movable pulley 5 is provided with a first cylinder 8 exerting a hydraulic pressure on a rear surface of the movable pulley 5. The first cylinder 8 changes the position of the movable pulley 5 in an axial direction.

A V-shape pulley groove is formed in the secondary pulley 2 by a fixed pulley 7 that is integrally fixed to an output shaft connected to a drive wheel, and a movable pulley 6 opposite the fixed pulley 7. A spring (not shown) urges the movable pulley 6 in such a direction as to narrow the groove width of the pulley groove. The movable pulley 6 is provided with a second cylinder 9 exerting a hydraulic pressure on a rear surface of the movable pulley 6. The second cylinder 9 changes the position of the movable pulley 6 in an axial direction.

A hydraulic control circuit 20 controls the transmission mechanism 10 based on a signal from a controller 11. The hydraulic control circuit 20 constantly supplies line pressure to the second cylinder 9. The hydraulic control circuit 20 includes a speed ratio control valve 13. The speed ratio control valve 13 supplies regulated hydraulic pressure to the first cylinder 8 using the line pressure as a source pressure. The pressure receiving surface area of the first cylinder 8 is larger than the pressure receiving surface area of the second cylinder 9.

The speed ratio control valve 13 controls the hydraulic pressure acting on the first cylinder 8, changing the groove width of the primary pulley 1. The line pressure, on the other hand, is supplied to the second cylinder 9, thus controlling the clamping pressure on the V-belt 3 and performing speed changes. Drive force is transmitted according to contact friction forces between the V-belt 3, and the primary pulley 1 and the secondary pulley 2.

When the groove width of the primary pulley 1 widens, the contact radius between the primary pulley 1 and the V-belt 3 becomes smaller, while the contact radius between the secondary pulley 2 and the V-belt 3 becomes larger. The speed ratio increases as a result. The rotating speed on the engine side thus decreases, and this is output to an axle. Conversely, when the groove width of the primary pulley 1 decreases, the speed ratio decreases as a result. The rotating speed on the engine side thus increases, and this is output to the axle. The speed ratio can thus change in a continuous manner.

With the hydraulic control circuit 20, a line pressure regulator 12 regulates the hydraulic pressure of the working fluid discharged from a hydraulic pump 21, thus regulating the line pressure. The line pressure is constantly supplied to the second cylinder 9 and to the speed ratio control valve 13, as described above. The speed ratio control valve 13 controls the hydraulic pressure supplied to the first cylinder 8, taking the line pressure as a source pressure. A stepping motor 14 drives the speed ratio control valve 13. Actuators other than a stepping motor may be used to drive the speed ratio control valve 13. The hydraulic control circuit 20 further includes a line pressure solenoid 15, a pressure modifier 16, and a pilot valve 17.

The stepping motor 14 is installed above an oil level of an oil pan 30. Cooling of the stepping motor 14 is not performed by the working fluid that collects within the oil pan 30. Rather, the working fluid returning to the oil pan 30 falls onto the stepping motor 14 from above, thus cooling the stepping motor 14.

The controller 11 finds a necessary line pressure based on an input torque instruction and an input rotating speed instruction input from other controllers. The controller 11 outputs a duty ratio signal corresponding to the necessary line pressure as a hydraulic pressure instruction to the line pressure solenoid 15 and also outputs a speed change instruction to the stepping motor 14. The stepping motor 14 is configured to output a linear displacement. For example, a position from 20 to 170 steps from within a range of 200 steps is selected corresponding to a target speed ratio.

The line pressure solenoid 15 supplies hydraulic pressure from the pilot valve 17 to the pressure modifier 16 according to the duty ratio signal from the controller 11. The line pressure regulator 12 sets the hydraulic pressure from the hydraulic pump 21 to the line pressure that corresponds to the hydraulic pressure output from the pressure modifier 16. The line pressure thus changes in accordance with the magnitude of the transmitted drive force.

With the speed ratio control valve 13, a spool 13a is driven in accordance with displacement of a speed change link 18 hung between the movable pulley 5 of the primary pulley 1 and the stepping motor 14, and the line pressure from the line pressure regulator 12 is regulated and supplied to the first cylinder 8. When the groove width corresponding to the position of the stepping motor 14 is attained, the supply of hydraulic pressure to the first cylinder 8 is stopped by displacing the speed change link 18 that moves together with the movable pulley 5. The groove width of the primary pulley 1 thus changes, and a predetermined speed ratio can be obtained.

A rotating speed sensor 31 that detects the input rotating speed of the primary pulley 1 and a rotating speed sensor 32 that detects the output rotating speed of the secondary pulley 2 are connected to the controller 11. Detection signals from the rotating speed sensors 31 and 32 are input to the controller 11. The controller 11 finds the actual speed ratio of the transmission mechanism 10 based on the detection signals.

In addition, a timer 22 that measures a period of time for which a vehicle is stopped is attached to the controller 11. Further, outputs from a vehicle speed sensor 23 that detects vehicle speed, a rotating speed sensor 24 that detects the rotating speed of the primary pulley 1, an accelerator pedal operation amount sensor 25 that detects the amount by which an accelerator pedal has been operated, an oil temperature sensor 26 that detects the temperature of the working fluid of the continuously variable transmission, a rotating speed sensor 27 that detects the rotating speed of the engine, a select lever position detection sensor 28 that detects the position of a select lever, and a brake sensor 29 that detects whether or not a brake pedal has been depressed, are input to the controller 11.

As described above, the stepping motor 14 is installed above the oil level of the oil pan 30. In other words, the stepping motor 14 is installed in a position where it is not submerged by the working fluid collecting within the oil pan 30. Accordingly, cooling of the stepping motor 14 is not performed by the working fluid that collects within the oil pan 30. Instead, the working fluid drops down onto the stepping motor 14 from above when returning to the oil pan 30, thus cooling the stepping motor 14. Although sufficient cooling can be assured with this method when the vehicle is running, the returning working fluid does not sufficiently cool the stepping motor 14 when the vehicle stops for a long period of time in an idling state. In this case the controller 11 performs deenergization control of the stepping motor 14, as described below.

Figure 3:
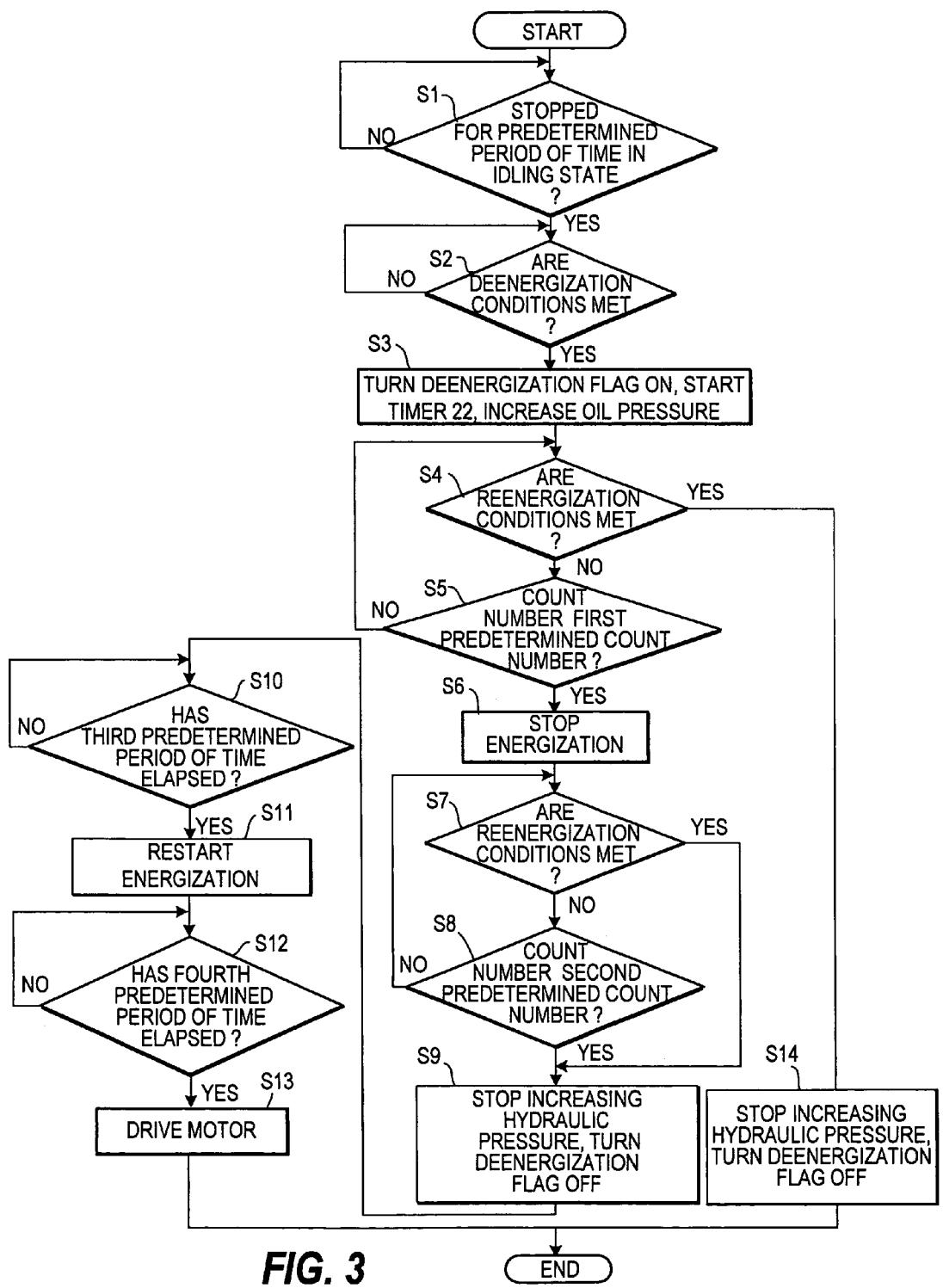
FIG. 3 is a flowchart of deenergization control performed by a controller.

FIG. 3 is a flowchart that shows deenergization control of the stepping motor 14 performed by the controller 11.

First, in a step S1, a determination is made as to whether or not the vehicle has been stopped in an idling state for a period of time greater than a predetermined period of time. For example, the vehicle is determined to be stopped in an idling state when the engine is rotating in a predetermined low rotating speed range, when the break pedal is being depressed, and when the vehicle speed is substantially zero.

In a step S2, a determination is made as to whether or not deenergization conditions have been met for the stepping motor 14. The deenergization conditions are judged to have been met when each of the conditions A1 to A10 described below, for example, has existed for a predetermined period of time or longer (0.5 seconds, for example).

A1: Initialization of the stepping motor 14 is complete (setting the speed ratio to a maximum, for example).

A2: The vehicle speed is less than 3 km/h.

A3: The rotating speed of the primary pulley 1 is less than 200 rpm.

A4: The target step number for the stepping motor 14 is constant.

A5: The step number instructed to the stepping motor 14 is the same as the target step number.

A6: The accelerator pedal is operated by an amount less than 0.5/8.

A7: The vehicle speed signal, the rotating speed signal for the primary pulley 1, and the accelerator pedal operation amount signal input from the sensors are all normal.

A8: An abnormality determination is not being made for the stepping motor 14.

A9: The stepping motor 14 is in a normal state.

A10: The oil temperature sensor 26 shows an abnormality, or the oil temperature is equal to or greater than 110° C. (first predetermined temperature).

A relationship between operating history and oil temperature from the time the engine is turned on, for example, may be detected and stored in advance in order to determine whether the oil temperature sensor 26 is operating normally or abnormally. By comparing the stored relationship with an actual relationship between the engine operating history and detected oil temperature values, a determination can be made as to whether the oil temperature sensor 26 is operating normally or abnormally.

Figure 4:
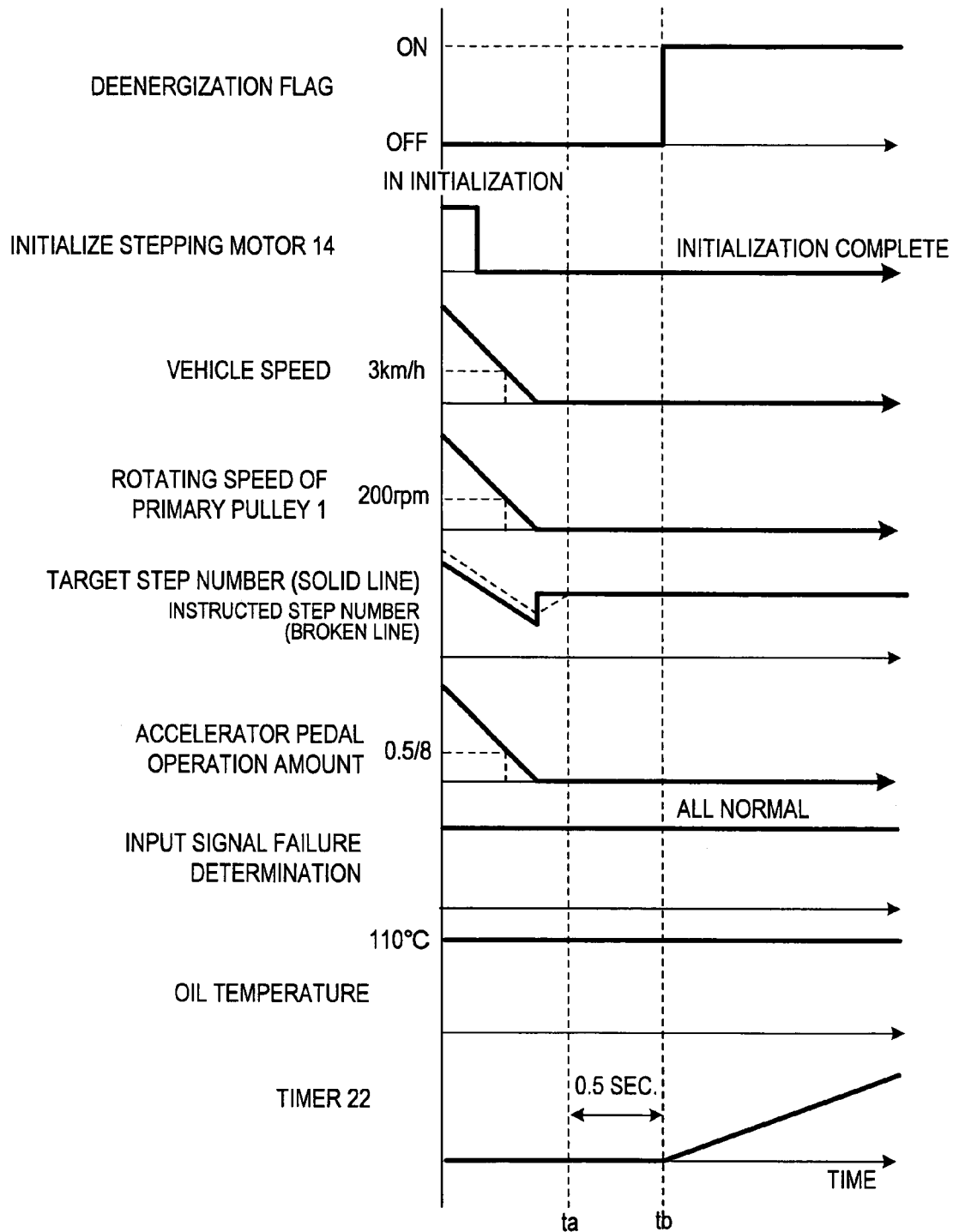
FIG. 4 is a time chart that explains deenergization conditions.

When the deenergization conditions are met, processing proceeds to a step S3. A deenergization flag of the stepping-motor 14 is turned on, and the timer 22 begins to count. FIG. 4 shows a timing chart, which shows that the deenergization conditions are met at a time ta, and the deenergization flag is turned on at a time tb, 0.5 seconds after the time ta.

In addition, when the select lever is set to a position other than neutral (such as drive, low, reverse, or parking), an instruction signal to increase the supply of hydraulic pressure to the primary pulley 1 and the secondary pulley 2 is output to the hydraulic pump 21. This is done because when energization to the stepping motor 14 is stopped while the shift lever is in a position other than neutral, noise that occurs during deenergization causes the supply of hydraulic pressure to the primary pulley 1 and the secondary pulley 2 to decrease, and there is a possibility that belt slippage will occur. Belt slippage can be prevented when the hydraulic pressure supplied is increased in advance.

In a step S4, a determination is made as to whether the reenergization conditions for the stepping motor 14 have been met. The reenergization conditions are determined to have been met when at least one of conditions B1 to B10 described below is met, for example.

B1: The vehicle speed is equal to or greater than 5 km/h.

B2: The rotating speed of the primary pulley 1 is equal to or greater than 500 rpm.

B3: The target step number for the stepping motor 14 has changed.

B4: The step number instructed to the stepping motor 14 is not the same as the target step number.

B5: The accelerator pedal is operated by an amount equal to or greater than $\frac{1}{8}$.

B6: There is an abnormality in any one of the vehicle speed signal, the rotating speed signal of the primary pulley 1, and the accelerator pedal operation amount signal input from the sensors.

B7: An abnormality determination is being made for the stepping motor 14.

B8: The stepping motor 14 is in an abnormal state.

B9: The oil temperature sensor 26 is operating normally and the oil temperature is less than 105° C. (second predetermined temperature).

When the reenergization conditions are satisfied, processing proceeds to a step S14. In the step S14, output of the instruction to increase the hydraulic pressure supplied to the primary pulley 1 and the secondary pulley 2 is stopped, the deenergization flag is turned off, and processing is complete.

On the other hand, processing proceeds to a step S5 when the reenergization conditions are not satisfied, and a determination is made as to whether or not a count number after the deenergization flag is turned on is equal to or greater than a first predetermined count number (first predetermined period of time). Processing proceeds to a step S6 when the count number is equal to or greater than the first predetermined count number, where the energization to the stepping motor 14 is stopped. Processing returns to the step S4 when the count number is less than the first predetermined count number. In consideration of the fact that there is a delay in the increase in the supply of hydraulic pressure after the output of a command to increase the hydraulic pressure supplied to the primary pulley 1 and the secondary pulley 2 in the step S3, the energization to the stepping motor 14 is stopped only after waiting until the count number reaches the first predetermined count number. This is done in order to reliably increase the hydraulic pressure supplied to the primary pulley 1 and the secondary pulley 2 by the time of deenergization. The first predetermined count number is therefore set to a period of time necessary to increase the hydraulic pressure supplied.

In a step S7, similar to the step S4, a determination is made as to whether or not the reenergization conditions are satisfied. Processing proceeds to a step S9 when the reenergization conditions are satisfied, and proceeds to a step S8 when the reenergization conditions are not met.

In the step S8, a determination is made as to whether or not the count number of the timer 22 after the deenergization flag is turned on is equal to or greater than a second predetermined count number (second predetermined period of time). Processing proceeds to the step S9 when the count number is equal to or greater than the second predetermined count number.

In the step S9, output of the command signal to the hydraulic pump 21 to increase hydraulic pressure supplied to the primary pulley 1 and the secondary pulley 2 is halted, and the deenergization flag is switched from on to off.

In a step S10, a determination is made as to whether or not a predetermined period of time (third predetermined period of time) has elapsed after the increase in the hydraulic pressure supplied to the primary pulley 1 and the secondary pulley 2 was stopped. Processing proceeds to a step S11 when the predetermined period of time has elapsed. Waiting for the predetermined period of time is done because a certain period of time is required from the instruction to stop increasing the hydraulic pressure supplied until the supplied hydraulic pressure actually decreases. The predetermined period of time is therefore set to a period of time necessary for the supplied hydraulic pressure to actually decrease.

In the step S11, energization to the stepping motor 14 is restarted.

In a step S12, a determination is made as to whether or not a predetermined period of time (fourth predetermined period of time) has elapsed from restarting energization to the stepping motor 14. Processing proceeds to a step S13 when the predetermined period of time has elapsed, and the stepping motor 14 is driven. The stepping motor 14 can be prevented from stepping out by driving the stepping motor 14 from the point where the predetermined period of time has elapsed from restarting energization to the stepping motor 14. The predetermined period of time is set here to a period of time sufficient for preventing stepping out of the stepping motor 14.

Figure 5:
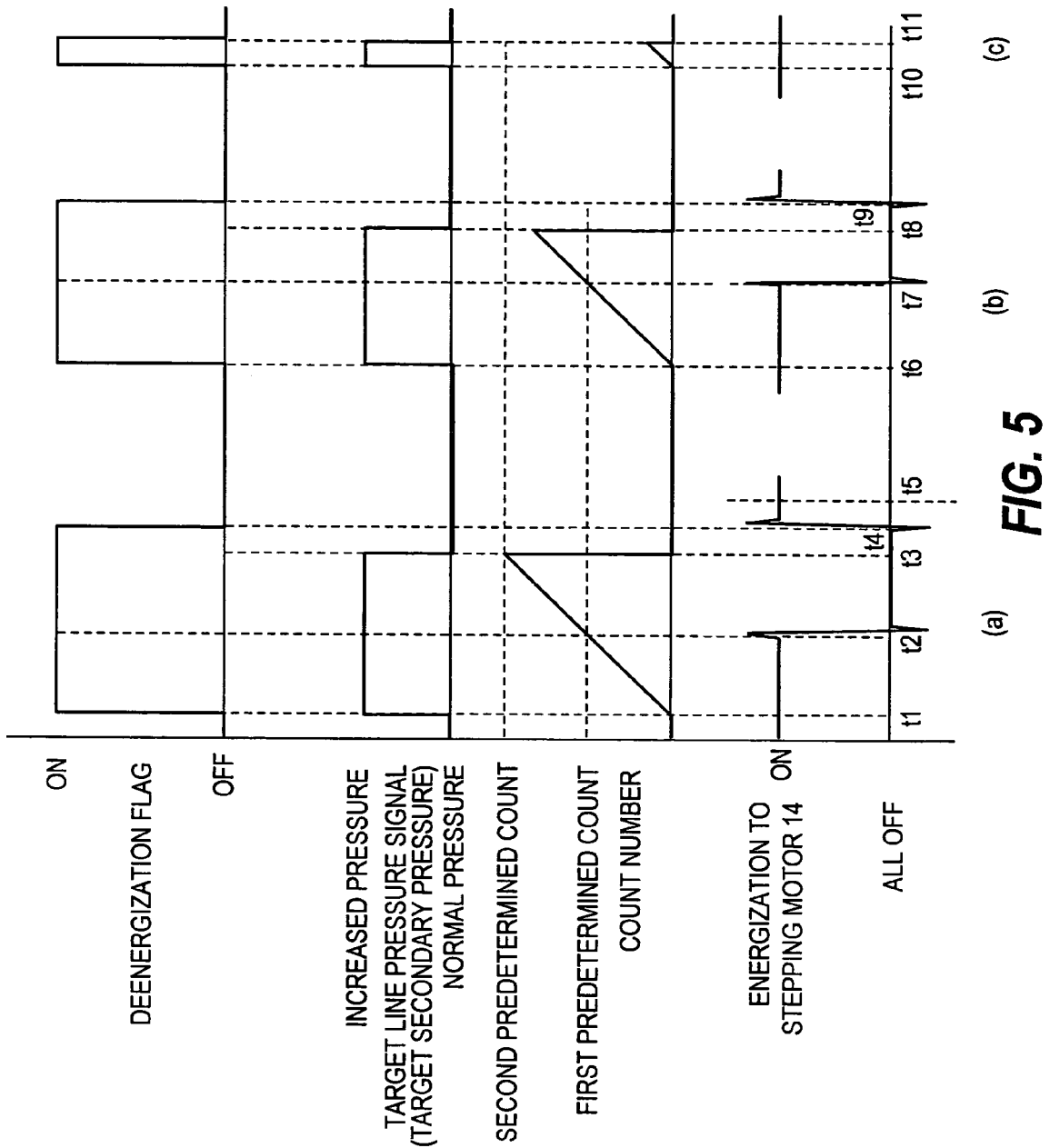
FIG. 5 is a time chart that explains deenergization control.

FIG. 5 is a timing chart that shows how deenergization control of the stepping motor of this invention is performed. Symbol (a) shows a case where energization is stopped after the deenergization conditions are reached, and then energization is restarted when the count number of the timer 22 reaches the second predetermined count number. Symbol (b) shows a case where energization is stopped after the deenergization conditions are reached, and the reenergization conditions are met and energization is restarted before the count number of the timer 22 reaches the second predetermined count number. Symbol (c) shows a case where deenergization is not performed because the reenergization conditions were met before the count of the timer 22 reaches the first predetermined count number after the deenergization conditions are reached.

Looking at the (a) case, the deenergization conditions for the stepping motor 14 are reached at the time t1, and the deenergization flag is switched to on. Further, when the select lever is in a position other than a neutral position, a signal instructing an increase in the hydraulic pressure supplied to the primary pulley 1 and the secondary pulley 2 is output to the hydraulic pump 21. In addition, the count that measures the period of time elapsed from the time t1 is started.

When the count number reaches the first predetermined count number at a time t2, energization of the stepping motor 14 is turned off.

When the count number reaches the second predetermined count number at a time t3, output of a signal instructing an increase in the amount of hydraulic pressure supplied to the primary pulley 1 and the secondary pulley 2 is stopped first. The deenergization flag is then turned off at the time t4 when a predetermined period of time has elapsed. Driving of the stepping motor 14 is started when a predetermined period of time has elapsed after energization restarts. Stepping out of the stepping motor 14 is prevented by providing a delay from the energization to the driving.

Symbol (b) shows a case where the deenergization conditions of the stepping motor 14 are reached at a time t6, energization to the stepping motor 14 is stopped at a time t7, and the reenergization conditions are reached at a time t8 before the count number from the point where the deenergization conditions are met reaches the second predetermined count number. When the reenergization conditions are reached at the time t8, output of a signal instructing an increase of the hydraulic pressure supplied to the primary pulley 1 and the secondary pulley 2 is stopped. Energization to the stepping motor 14 is restarted at a time t9 when a predetermined period of time has elapsed after the increase of the hydraulic pressure supplied is stopped.

Symbol (c) shows a case where the deenergization conditions of the stepping motor 14 are reached at a time t10, and the reenergization conditions are met at a time t11 before the count number reaches the first predetermined count number. Deenergization is thus not performed. Accordingly, the deenergization flag is turned off at the time t11 and only the output of the signal instructing an increase in the hydraulic pressure to the primary pulley 1 and the secondary pulley 2 is halted.

What is claimed is:

1. A belt continuously variable transmission comprising:
   a primary pulley and a secondary pulley each having a groove whose width changes in accordance with a pressure of a working fluid supplied;
   a belt that is hung between the primary pulley and the secondary pulley;
   a hydraulic pump that discharges the working fluid;
   a speed ratio control valve that regulates the pressure of the working fluid from the hydraulic pump and supplies the pressure to the primary pulley and the secondary pulley;
   an actuator that drives the speed ratio control valve;
   a temperature sensor that detects a temperature of the working fluid; and
   a controller connected to the actuator and the hydraulic pump and input with a detection signal from the temperature sensor, wherein
   the controller determines that deenergization conditions are met when the temperature of the working fluid becomes greater than a first predetermined temperature while a vehicle is at rest in an idling state, and stops energization to the actuator after the deenergization conditions have been met.

2. The belt continuously variable transmission as defined in claim 1, wherein the controller stops energization to the actuator once a first predetermined period of time has elapsed after determining that the deenergization conditions are met.

3. The belt continuously variable transmission as defined in claim 1, further comprising:
   a select lever; and
   a position sensor that detects a position of the select lever, wherein the controller regulates an output of the hydraulic pump to increase the hydraulic pressure supplied to the primary pulley and the secondary pulley, after determining that the deenergization conditions are met and before stopping energization to the actuator.

4. The belt continuously variable transmission as defined in claim 3, wherein the controller stops increasing the hydraulic pressure once a second predetermined period of time has elapsed after determining that the deenergization conditions are met, the second predetermined period of time being longer than the first predetermined period of time.

5. The belt continuously variable transmission as defined in claim 4, wherein the controller restarts energization to the actuator once a third predetermined period of time has elapsed after stopping increasing the hydraulic pressure.

6. The belt continuously variable transmission as defined in claim 5, wherein the controller drives the actuator after a fourth predetermined period of time elapses after restarting energization to the actuator.

7. The belt continuously variable transmission as defined in claim 1, wherein the controller restarts energization to the actuator when, while energization to the actuator is stopped, the temperature of the working fluid becomes lower than a second predetermined temperature which is lower the first predetermined temperature.

8. The belt continuously variable transmission as defined in claim 1, wherein the controller determines whether or not there is an abnormality in the oil temperature sensor, and determines that the deenergization conditions are met when an abnormality is determined to have occurred in the oil temperature sensor while the vehicle is at rest in an idling state.

* * * * *